United States Patent
Sarkar

(10) Patent No.: US 10,880,935 B2
(45) Date of Patent: Dec. 29, 2020

(54) SECURE CALL ENDPOINT PAIRING

(71) Applicant: Plantronics, Inc., Santa Cruz, CA (US)

(72) Inventor: Shantanu Sarkar, San Jose, CA (US)

(73) Assignee: Plantronics, Inc., Santa Cruz, CA (US)

(*) Notice: Subject to any disclaimer, the term of this patent is extended or adjusted under 35 U.S.C. 154(b) by 0 days.

(21) Appl. No.: 15/922,471

(22) Filed: Mar. 15, 2018

(65) Prior Publication Data
US 2019/0289653 A1 Sep. 19, 2019

(51) Int. Cl.
| | | |
|---|---|---|
| H04L 12/26 | (2006.01) | |
| H04W 76/14 | (2018.01) | |
| H04M 3/56 | (2006.01) | |
| H04M 1/60 | (2006.01) | |
| H04W 12/08 | (2009.01) | |
| H04W 12/00 | (2009.01) | |
| H04W 84/18 | (2009.01) | |
| H04W 4/80 | (2018.01) | |
| H04L 29/06 | (2006.01) | |

(52) U.S. Cl.
CPC ......... H04W 76/14 (2018.02); H04M 1/6066 (2013.01); H04M 3/56 (2013.01); H04W 12/003 (2019.01); H04W 12/08 (2013.01); H04L 65/40 (2013.01); H04W 4/80 (2018.02); H04W 84/18 (2013.01)

(58) Field of Classification Search
CPC ............. H04N 7/148; H04W 52/0241; H04W 76/023; H04W 76/14; H04W 76/021; H04W 4/023; H04W 4/008; H04W 12/06; H04M 1/6066; H04M 3/56; H04M 1/7253
See application file for complete search history.

(56) References Cited

U.S. PATENT DOCUMENTS

| | | | | |
|---|---|---|---|---|
| 7,912,020 B2 * | 3/2011 | Khasawneh | ............ | H04M 3/56 370/338 |
| 7,953,400 B2 * | 5/2011 | Lee | ..................... | H04L 63/0492 370/328 |
| 8,606,334 B2 * | 12/2013 | Goldman | .......... | H04M 1/72502 455/569.1 |
| 8,634,878 B2 * | 1/2014 | Sarkissian | ........... | H04M 1/6066 370/277 |

(Continued)

FOREIGN PATENT DOCUMENTS

| | | |
|---|---|---|
| EP | 2257035 A1 | 12/2010 |
| WO | WO-2017/030584 A1 | 2/2017 |

OTHER PUBLICATIONS

PCT International Search Report for international application No. PCT/US2019/022464, dated Sep. 2, 2019 (8 pages).

(Continued)

*Primary Examiner* — Hanh N Nguyen
(74) *Attorney, Agent, or Firm* — Ferguson Braswell Fraser Kubasta PC

(57) ABSTRACT

A method for secure call endpoint pairing is disclosed. The method includes starting, at a call endpoint, a pairing procedure with a wireless headset. Also, the method includes receiving a headset identifier from the wireless headset. Further, the method includes sending the headset identifier in a request to a headset registry server, and receiving, from the headset registry server, a response to the request. Additionally, the method includes terminating the pairing procedure based on the response from the headset registry server.

9 Claims, 7 Drawing Sheets

(56) References Cited

U.S. PATENT DOCUMENTS

| | | | |
|---|---|---|---|
| 8,700,100 B2* | 4/2014 | Park | H04M 1/6066 |
| | | | 455/567 |
| 8,769,612 B2* | 7/2014 | Ganapathy | H04W 12/06 |
| | | | 726/3 |
| 9,094,407 B1 | 7/2015 | Matthieu et al. | |
| 9,398,361 B1* | 7/2016 | Jaques | H04R 1/1041 |
| 2008/0200159 A1 | 8/2008 | Lai | |
| 2010/0227549 A1* | 9/2010 | Kozlay | H04L 9/0662 |
| | | | 455/26.1 |
| 2013/0265857 A1* | 10/2013 | Foulds | H04W 4/21 |
| | | | 367/199 |
| 2014/0223174 A1 | 8/2014 | Krishnamurthy et al. | |
| 2018/0014145 A1 | 1/2018 | Seaman | |
| 2018/0063310 A1* | 3/2018 | McGary | H04W 4/80 |
| 2019/0082477 A1* | 3/2019 | Burton | H04W 4/023 |

OTHER PUBLICATIONS

PCT Written Opinion of the International Searching Authority for international application No. PCT/US2019/022464, dated Sep. 2, 2019 (11 pages).

* cited by examiner

Johnson, Joe
Plantronics Deskphone 300 – Ext. 7900

APPROVED PRIMARY DEVICES

| MODEL | HEADSET ID |
|---|---|
| VOYAGER 5200 | ABC23 |
| VOYAGER 8200 UC | BDB10 |

[ADD]  [REMOVE]

APPROVED CONFERENCE DEVICES

| USER | MODEL | HEADSET ID |
|---|---|---|
| SALLY SMITH | VOYAGER FOCUS | DB853 |

[ADD]  [REMOVE]

[SAVE]  [CANCEL]

SECURE CALL ENDPOINT PAIRING

FIELD

The present disclosure relates generally to the field of enterprise telephony devices. More particularly, the present disclosure relates to securing call endpoints that exchange call audio with a headset over a wireless link.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

As companies embrace open office environments, there are fewer physical barriers (e.g., doors, etc.) for preventing unauthorized access to employee work areas, such as cubicles and desks. As a result, it has become easier for troublemakers to access user-assigned devices that are fixed in the environment when the user to which such a device has been assigned is away. Examples of such user-assigned devices include desk-based telephones and computers. Further, as these devices are more frequently configured to include wireless point-to-point technologies, such as Bluetooth technology, they become easier to access remotely, without the knowledge of other users in close physical proximity to the fixed device. Accordingly, such devices can give rise to unique security concerns. This is especially true in scenarios where the desk-based hardware includes technology that has simplified the pairing or linking process. For example, Bluetooth devices may rely on an out-of-band exchange of link key information, using, for example, near-field communications (NFC). As another example, with applicability to DECT devices (inclusive of devices operating in accordance with Digital European Cordless Telecommunications or Unlicensed Personal Communications Services (UPCS) bands, including Digital Enhanced Cordless Telecommunications telephony devices (e.g., DECT 6.0 devices, etc.)), a headset and base may be subscribed to each other by briefly docking (i.e., physically connecting) the headset into the base. Accordingly, an unscrupulous individual may only require momentary access to a user's desk to pair a headset with the wireless hardware at the desk, which may allow the unscrupulous individual to hijack the user's telephone and/or eavesdrop on his or her calls.

SUMMARY

In general, in one aspect, a method for secure call endpoint pairing is disclosed. The method includes starting, at a call endpoint, a pairing procedure with a wireless headset. Also, the method includes receiving a headset identifier from the wireless headset. Further, the method includes sending the headset identifier in a request to a headset registry server, and receiving, from the headset registry server, a response to the request. Additionally, the method includes terminating the pairing procedure based on the response from the headset registry server.

In general, in one aspect, a method for secure call endpoint pairing is disclosed. The method includes, during an active call at a call endpoint, sending receive call audio to a first wireless headset and receiving transmit call audio from the first wireless headset. Also, the method includes, during the active call, receiving, from a second wireless headset, a request to conference into the active call. The request includes a headset identifier of the second wireless headset. Further, the method includes sending, to a headset registry server, the headset identifier of the second wireless headset, and receiving a response from the headset registry server. Still further, the method includes managing, based on the response from the headset registry server, the request to conference into the active call from the second wireless headset.

In general, in one aspect, a method for secure call endpoint pairing is disclosed. The method includes receiving, from a call endpoint, a request. The request includes a headset identifier of a wireless headset and a call endpoint identifier of the call endpoint. Also, the method includes performing, in response to receiving the request, a lookup for a previously defined association between the headset identifier and the call endpoint identifier. In addition, the method includes determining, based on a result of the lookup, whether the wireless headset is approved to communicate with the call endpoint. Further, the method includes generating a response based on the determination, and sending the response to the call endpoint.

The details of one or more implementations are set forth in the accompanying drawings and the description below. Other features will be apparent from the description and drawings, and from the claims.

DESCRIPTION OF DRAWINGS

FIGS. 6A and 6B show an example of a secure call endpoint pairing communication flow, in accordance with one or more embodiments.

DETAILED DESCRIPTION

Figure 1:
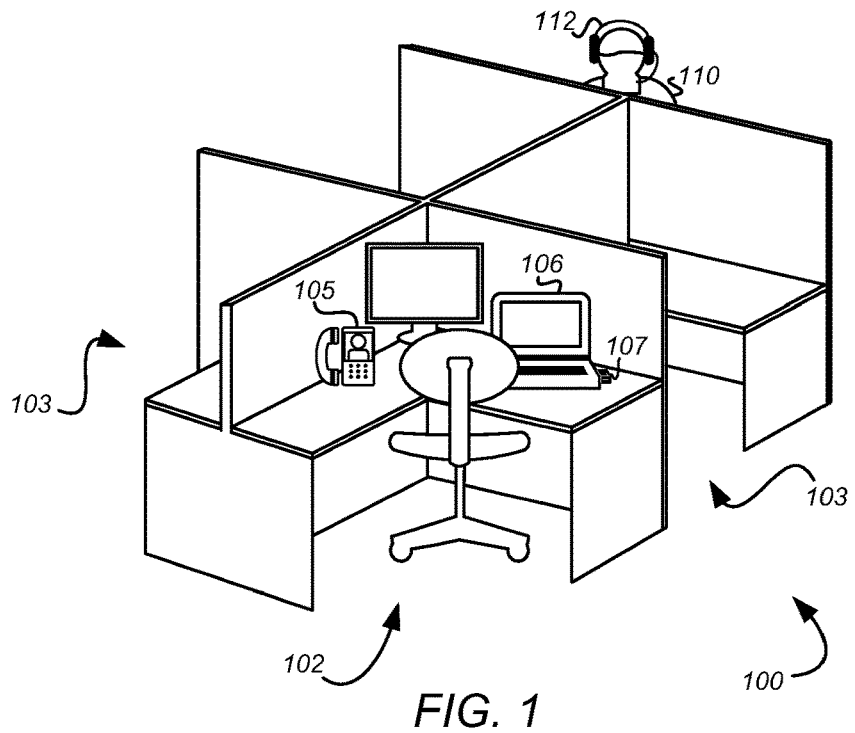
FIG. 1 depicts an environment for secure call endpoint pairing, in accordance with one or more embodiments.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named the elements. For example, a first element is distinct from a second element, and the first element may encompass more than one element and succeed (or precede) the second element in an ordering of elements.

As companies embrace open office environments, and it is increasingly common for telecommunications hardware in such environments to support wireless communications technologies, such as Bluetooth and DECT, new concerns have arisen regarding intermeddlers intercepting and/or eavesdropping on the telephone calls of others. For example, in such an environment, an unscrupulous individual may walk up to a user's desk phone without first opening a lockable office door, and configure the desk phone so that he or she can remotely access the desk phone via a wireless link at some later time. In particular, the individual may pair his or her headset to the desk phone in order to subsequently eavesdrop on conversations or answer incoming calls on behalf of the user to which the desk phone belongs.

Thus, at present, many wireless bases or host devices are entirely reliant upon physical access limitations to provide security from intermeddlers. One solution, beyond physical restriction and/or oversight, is to tie a phone number to a wireless headset, instead of a fixed base or computer. In such a solution, the base is inactive (i.e., does not have a valid extension number) until a headset is paired or subscribed to the base, and the base returns to being inactive when the headset leaves the transmission range of the base. Unfortunately, however, this is not an appropriate solution for deployments where users intend to use the desk phone without a headset (i.e., such as with a handset or speakerphone), and is inconvenient for users that frequently leave and return to transmission range of the base in the course of a workday.

In general, embodiments of the invention provide a system, a method, and a computer readable medium for securing a call endpoint in a manner that prevents the unauthorized association of a wireless headset with the endpoint. Such unauthorized association may undesirably allow one user to impersonate or eavesdrop on the calls of another user. Thus, the systems and methods disclosed herein prevent such intermeddling where constant physical restrictions and/or oversight are not practical. Accordingly, by way of the systems and methods described herein, a call endpoint, such as a desk phone or computer running a voice over Internet Protocol (VoIP) client, may be configured such that it only sends and receives call audio to and from a wireless headset that has been previously and securely provisioned for use with the call endpoint.

FIG. 1 shows an environment 100 that relies on a headset registry for secure call endpoint pairing, according to one or more embodiments. Although the elements of the environment 100 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1 may be omitted, repeated, and/or substituted. Accordingly, various embodiments may lack one or more of the features shown. For this reason, embodiments of the invention should not be considered limited to the specific arrangements of elements shown in FIG. 1.

As depicted in FIG. 1, the environment 100 includes a workstation 102. The environment 100 also includes one or more neighboring workstations 103 in proximity to the workstation 102. As used herein, the workstation 102 includes any workspace in which a person (i.e., a user, an individual, etc.) may engage in one or more tasks. A workstation may include, for example, a desk, a cubicle, a conference room, and/or an office. Accordingly, as shown in FIG. 1, the neighboring workstations 103 are desks or cubicles adjacent to the workstation 102.

As shown in FIG. 1, the workstation 102 includes a desk phone 105 and a computer 106. The desk phone 105 includes any desk-resident hardware device that may be used to make and/or answer telephone calls. As described herein, the computer 106 includes any electronic device capable of executing a VoIP client. The computer 106 may include, for example, a laptop computer, a desktop computer, a tablet computer, or a smartphone. As shown in FIG. 1, a wireless transceiver 107 is coupled to the computer 106. The wireless transceiver 107 enables the computer 106 to form a wireless link with one or more wireless headsets, such as the headsets of the user that works from the workstation 102. The wireless transceiver 107 may include, for example, a DECT transceiver, a Bluetooth transceiver, or IEEE 802.11 (Wi-Fi) transceiver. In one or more embodiments, the wireless transceiver 107 may include a dongle configured to be removably connected to a port (e.g., Universal Serial Bus (USB) port, etc.) of the computer 106. Although not shown in FIG. 1, it is understood that the desk phone 105 also includes a wireless transceiver substantially similar to the wireless transceiver 107, described above. The wireless transceiver of the desk phone 105 may be integrated directly into the desk phone 105, or attached to the desk phone 105 as a dongle or headset base. In one or more embodiments, the desk phone 105 and/or the computer 106 may be in communication with a central call control system. The desk phone 105 and/or the computer 106 may include logic for registering to a private branch exchange (PBX) (e.g., a VoIP PBX, etc.). Thus, as used herein, a "call endpoint" includes the desk phone 105 or the computer 106.

The environment 100 is typical of a modern open office environment in which the desk phone 105 and the computer 106 are physically accessible to numerous users other than the user that regularly sits at the workstation 102. For example, as shown in FIG. 1, an intermeddler 110 is walking through the environment 100 while a user that sits at the workstation 102 is temporarily away from the workstation 102, leaving the desk phone 105 and the computer 106 unattended. The intermeddler 110 is carrying a wireless headset 112, such as a DECT or Bluetooth wireless headset.

In prior art systems, the wireless headset 112 may be paired to the desk phone 105 and/or the computer 106, even if the computer 106 has been locked to prevent unauthorized access of the data resident on the computer 106. In prior art systems, the intermeddler 110 may be able to pair the headset 112 to the computer 106 by placing the wireless transceiver 107 in a pairing mode and immediately pairing the headset 112 with the wireless transceiver 107. Similarly, in prior art systems, the intermeddler 110 may be able to pair the headset 112 to the desk phone 105 by placing the desk phone 105 into a pairing mode and immediately pairing the headset 112 with the desk phone 105.

The intermeddler 110 may initiating pairing or conferencing at the wireless transceiver 107 or the desk phone 105 in any suitable manner. For example, the intermeddler 110 may temporarily depress a user-operable control on the wireless transceiver 107 or the desk phone 105, respectively.

As another example, the intermeddler 110 may initiate such pairing modes simply by bringing the wireless headset 112 in close proximity with the wireless transceiver 107 or the desk phone 105 (e.g., NFC, etc.), or by electromechanically coupling (e.g., docking, etc.) the devices. In any case, in a prior art system, the intermeddler 110 only requires momentary access to the computer 106 and/or the desk phone 105 to pair the headset 112 to either of the devices. The pairing procedure may occur while no calls are active, such that the newly-subscribed headset 112 will receive incoming call notifications to the exclusion of the actual owner of the call endpoint. This can be especially problematic in instances where the call endpoint includes a DECT transceiver or Class 1 Bluetooth transceiver, as the intermeddler 110 may initiate and receive telephone calls at the phone number attached to the call endpoint from a distance of up to 100 meters away. Thus, in a prior art system, the intermeddler 110 may be able to answer incoming calls to the desk phone 105 and/or computer 106 on behalf of the user that works at the workstation 102. Still yet, the intermeddler 110 may wait to engage in such mischief hours, days, or weeks later, and at distances up to hundreds of feet away from the workstation 102, without the desk phone 105 or the computer 106 providing the user of the workstation 102 with any indication that such a pairing procedure has been performed by the intermeddler 110.

Of additional concern in prior art systems, if the user of the workstation 102 has temporarily stepped away from the workstation 102 with a wireless headset in order to privately continue an active call, the intermeddler 110 may be able to conference the headset 112 into the active call and eavesdrop on the discussion. For example, a call endpoint may allow the wireless headset 112 to temporarily subscribe to the call endpoint for purposes of call conferencing. Accordingly, if the user resident to workstation 102 walks away from his or her desk for purposes of conversational privacy, and is unable maintain a view of the workstation 102, the intermeddler 110 may join and eavesdrop on the call without the user being aware.

The systems and methods disclosed herein prevent the unapproved pairing of the headset 112 of the intermeddler 110 with the desk phone 105 and the computer 106 in the workstation 102. Thus, the systems and methods disclosed herein prevent the intermeddler 110 from remotely intercepting incoming calls to the desk phone 105 and the computer 106. Still yet, the systems and methods disclosed herein prevent the intermeddler 110 from conferencing himself or herself into ongoing calls at the desk phone 105 and/or the computer 106 without the knowledge of the user that is authorized to use those call endpoints.

Figure 2:
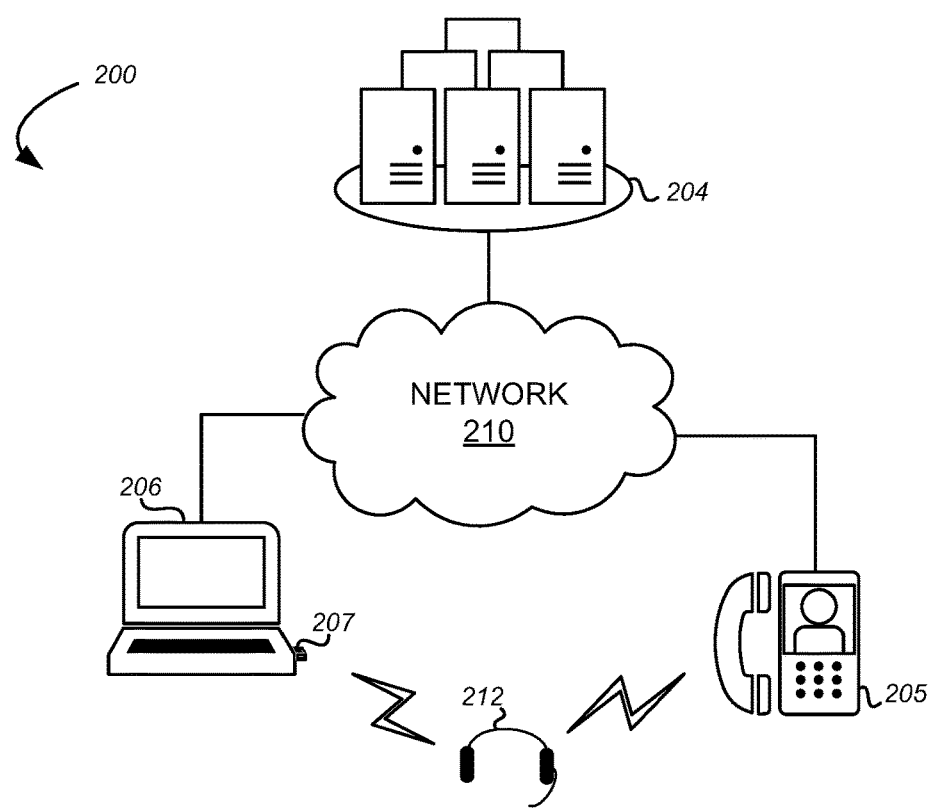
FIG. 2 depicts a system for secure call endpoint pairing, in accordance with one or more embodiments.

FIG. 2 shows system 200 for secure call endpoint pairing, according to one or more embodiments. Although the elements of the system 200 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2 may be omitted, repeated, and/or substituted. Accordingly, various embodiments may lack one or more of the features shown. For this reason, embodiments of the invention should not be considered limited to the specific arrangements of elements shown in FIG. 2.

As depicted in FIG. 2, the system 200 includes a desk phone 205, a computer 206, and a headset registry server 204, each of which are communicatively coupled to a network 210. The system 200 also includes a wireless headset 212 in wireless communication with the computer 206 and/or the desk phone 205. The wireless headset 212 includes any head-worn device with a microphone and speaker that is capable of sending and receiving call audio over a wireless link. Accordingly, the computer 206 may include a wireless transceiver 207 for forming a wireless link with the wireless headset 212. Similarly, the desk phone 205 may include a wireless transceiver (not shown) for forming a wireless link with the wireless headset 212. The wireless links may include, for example, a DECT link or a Bluetooth link. As described herein, the network 210 includes any private and/or public communications network, wired and/or wireless, such as a local area network (LAN), wide area network (WAN), and/or the Internet.

According to the systems and methods disclosed herein, the desk phone 205 and/or the computer 206 are configured to prevent pairing with an unpermitted headset, thereby preventing the ability of an intermeddler to hijack the telephone number(s) assigned to a VoIP client executing at the computer 206 and/or the desk phone 205. As used herein, the wireless headset 212 is "paired" with a call endpoint (e.g., a computer 206, a desk phone 205, etc.) when the wireless headset 212 and the call endpoint each consider the other device a trusted device by storing a credential for facilitating future authentication and wireless link formation. If the wireless headset 212 and the call endpoint are Bluetooth wireless devices, the credential stored by the paired devices may include a link key. If the wireless headset 212 and the call endpoint are DECT wireless devices, the credential stored by the paired devices may include an authentication key, also known as a subscription key, which may be subsequently used to set up wireless links between the headset 212 and the call endpoint.

Further, according to the systems and methods disclosed herein, a call endpoint (e.g., the desk phone 205, the computer 206, etc.) may be configured to limit the circumstances under which a paired headset 212 may open a wireless link over which call audio is sent and received. In particular, according to the systems and methods disclosed herein, even if the wireless headset 212 has already paired with a particular call endpoint, the call endpoint may reject requests from the wireless headset 212 to form a new wireless link unless a call involving a primary device is already in progress at the call endpoint. In other words, the wireless headset 212 may only be permitted to conference into calls at the call endpoint, and is not able to initiate new outgoing calls from the call endpoint or answer incoming calls to the call endpoint.

Figure 3B:
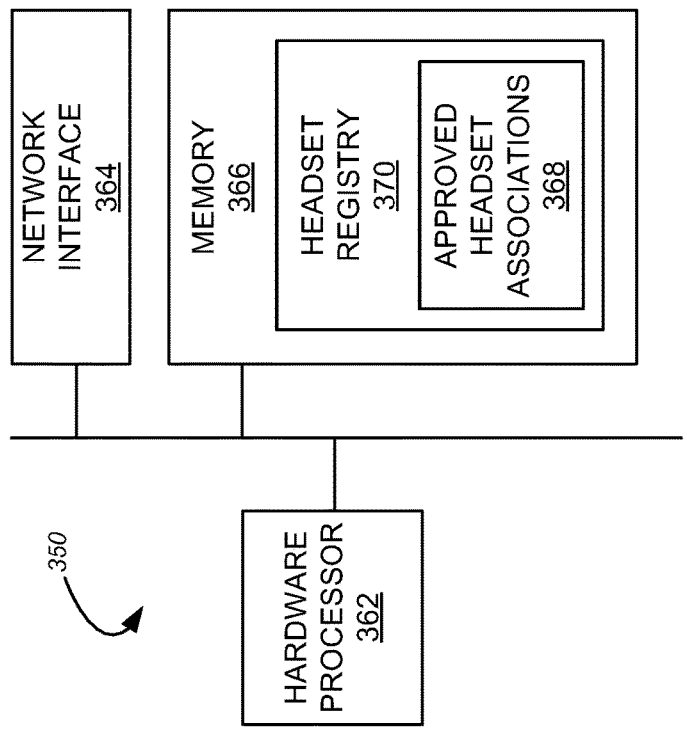
FIG. 3B depicts a block diagram of a headset registry server for secure call endpoint pairing, in accordance with one or more embodiments.
Figure 3A:
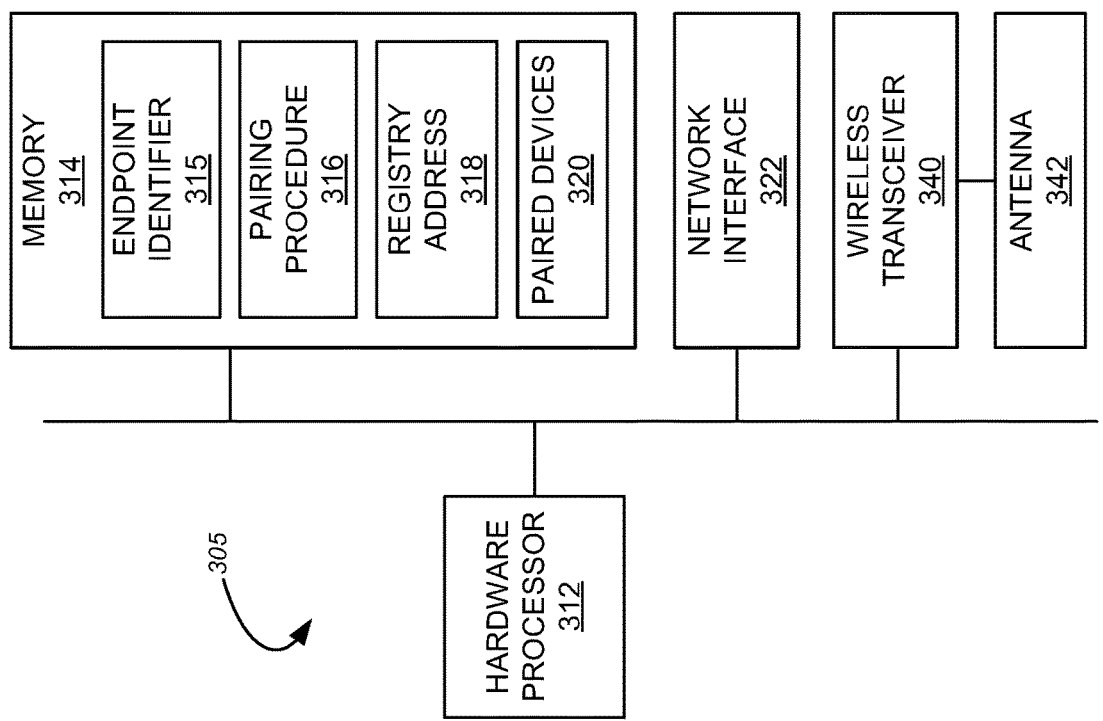
FIG. 3A depicts a block diagram of a call endpoint for secure call endpoint pairing, in accordance with one or more embodiments.

FIG. 3A depicts a block diagram of a call endpoint 305, according to one or more embodiments. Although the elements of the call endpoint 305 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 3A may be omitted, repeated, and/or substituted. Accordingly, various embodiments may lack one or more of the features shown. For this reason, embodiments of the invention should not be considered limited to the specific arrangements of elements shown in FIG. 3A.

As shown in FIG. 3A, the call endpoint 305 includes a hardware processor 312 operably coupled to a memory 314, a network interface 322, and a wireless transceiver 340 and accompanying antenna 342. In one or more embodiments, the hardware processor 312, the memory 314, the network interface 322, and the wireless transceiver 340 may remain in communication over one or more communication busses.

Although not depicted in FIG. 3A for purposes of simplicity and clarity, it is understood that, in one or more embodiments, the call endpoint 305 may include one or more of a display, a visual indicator (e.g., light emitting diode, etc.), a haptic device, and a user-operable control (e.g., a button, slide switch, capacitive sensor, touch screen, etc.). For example, the call endpoint 305 may include one or more of a call answer control, a call end control, a mute control, and a call volume control. In one or more embodiments, the call endpoint 305 may include a user-operable control to initiate a pairing procedure 316. Although not depicted in FIG. 3A, in one or more embodiments the call endpoint 305 may include an electromechanical connector. For example, the call endpoint 305 may include one or more electrical contacts configured to mate with the electrical contacts of a wireless headset. As an option, the call endpoint 305 may include one or more structures configured to support (i.e., dock, hold, etc.) the wireless headset such that the electrical contacts of the call endpoint 305 and the wireless headset are communicatively coupled.

The network interface 322 allows for communication, using digital and/or analog signals, with one or more other devices over a network. The network may include any private or public communications network, wired or wireless, such as a local area network (LAN), wide area network (WAN), or the Internet. The network may include the network 210, described above in reference to FIG. 2. Specifically, the network interface 322 includes any interface operable to transmit a headset identifier and/or an endpoint identifier 315 (i.e., a unique identifier of the call endpoint 305) to a headset registry server, such as the headset registry server 350. Also, the network interface 322 may be operable to receive a response from the headset registry server.

By way of the wireless transceiver 340, the call endpoint 305 transmits and receives information over an air interface with a wireless headset. In one or more embodiments, the wireless transceiver 340 may be, for example, a DECT transceiver or a Bluetooth transceiver. The antenna 342 converts electric power into radio waves under the control of the wireless transceiver 340, and intercepts radio waves which it converts to electric power and provides to the wireless transceiver 340. Accordingly, via the wireless transceiver 340 and the antenna 142, the call endpoint 305 may form a wireless link with a wireless headset.

The memory 314 includes any storage device capable of storing information temporarily or permanently. The memory 314 may include volatile and/or non-volatile memory, and may include more than one type of memory. For example, the memory 314 may include one or more of SDRAM, ROM, and flash memory. As depicted in FIG. 3A, the memory stores an endpoint identifier 315, a pairing procedure 316, a headset registry address 318, and a list of paired devices 320. As described herein, the hardware processor 312 processes data, including the execution of software, such as the pairing procedure 316, stored in the memory 314. In one or more embodiments, the hardware processor 312 is a high performance, highly integrated, and highly flexible system-on-chip (SOC). In one or more embodiments, the hardware processor 312 may include a variety of processors (e.g., digital signal processors, etc.), analog-to-digital converters, digital-to-analog converters, etc., with conventional CPUs being applicable.

The endpoint identifier 315 includes any unique value stored to the call endpoint 305 which may be used to differentiate the call endpoint 305 from other call endpoints, including call endpoints of the same manufacturer and/or model. The endpoint identifier 315 may include a serial number of the call endpoint 305. The endpoint identifier 315 may include a media access control (MAC) address of the call endpoint 305. The endpoint identifier 315 may include a telephone number and/or extension number of the call endpoint 305. If the wireless transceiver 340 includes a Bluetooth transceiver, the endpoint identifier 315 may include a Bluetooth address (BD_ADDR) of the call endpoint 305. If the wireless transceiver 340 includes a DECT transceiver, the endpoint identifier 315 may include a fixed part identity (e.g., Radio Fixed Part Identity (RFPI), Radio Fixed Part Number (RPN), etc.). To this end, the endpoint identifier 315 may include any unique software readable device identifier associated with the call endpoint 305.

The pairing procedure 316 is executable by the hardware processor 312. Prior to or during execution of the pairing procedure 316, the call endpoint 305 may receive a unique identifier from a wireless headset. The unique identifier of the wireless headset may be received wirelessly, via the wireless transceiver 340. The unique identifier of the wireless headset may be received over a physical connection. If the wireless headset is a Bluetooth device, the unique identifier of the wireless headset may include a Bluetooth device address (i.e., BD_ADDR) of the wireless headset. The Bluetooth device address of the wireless headset may be received from the wireless headset, for example, during an inquiry procedure. As another example, if the wireless headset is a DECT device, the unique identifier of the wireless headset may include any suitable portable part identity (e.g., International Portable Part Equipment Identity (IPEI), Portable equipment Serial Number (PSN), International Portable User Identity (IPUI), etc.).

As shown in FIG. 3A, the call endpoint 305 maintains a list of paired devices 320. The list of pair devices 320 identifies one or more wireless headsets with which the call endpoint 305 has previously interacted to generate a security key with approval of the headset registry server 350. In one or more embodiments, the list of paired devices 320 contains, for a wireless headset approved to pair with the call endpoint 305, the unique identifier of the wireless headset.

As described herein, the pairing procedure 316 includes any process that results in the generation of a security key based on an interaction between the call endpoint 305 and a wireless headset. In one or more embodiments, the pairing procedure 316 may include the pairing procedure described in the Bluetooth Core Specifications published by Bluetooth SIG. In one or more embodiments, the pairing procedure 316 may include the subscription process (e.g., subscription registration, etc.) described in the DECT standard published by ETSI. The security key may only be generated after a pairing between the call endpoint 305 and the wireless headset has been approved by the headset registry server 350, as described below. The security key is used to authenticate subsequent communications between the call endpoint 305 and the wireless headset, such as during call set-up. For example, if the pairing procedure 316 is for registering or subscribing a DECT headset to the call endpoint 305, the pairing procedure 316 may include generating an authentication key. If the pairing procedure 316 is for pairing a Bluetooth headset to the call endpoint 306, the pairing procedure 316 may include generating a link key.

In one or more embodiments, a unique identifier of the wireless headset is sent to a headset registry server 350, at the headset registry address 318, during execution of the pairing procedure 316. Also, a response is received from the headset registry server 350 during the execution of the pairing procedure 316. Whether or not the wireless headset associated with the unique identifier is paired with the call endpoint 305, and added to the list of paired devices 320, depends on the contents of the response from the headset registry server 350, as described below. In other words, depending on a response received from the headset registry server 350 during execution of the pairing procedure 316, the wireless headset may or may not be paired with the call endpoint 305. Thus, based on the response received form the headset registry server 350, the hardware processor 312 may add a wireless headset to the list of paired devices 320, or prevent the addition of a wireless headset to the list of paired devices 320.

The headset registry address 318 includes an address of one or more remote servers hosting a headset registry, such as the headset registry server 350 hosting the headset registry 370, described in the context of FIG. 3B, below. During execution of the pairing procedure 316, the call endpoint 305 may transmit, via the network interface 322, the endpoint identifier 315 and a unique identifier of a wireless headset to the server(s) at the headset registry address 318. The headset registry address 318 may include an IP address, server name, domain, etc.

FIG. 3B depicts a block diagram of a headset registry server 350, according to one or more embodiments. Although the elements of the headset registry server 350 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 3B may be omitted, repeated, and/or substituted. Accordingly, various embodiments may lack one or more of the features shown. For this reason, embodiments of the invention should not be considered limited to the specific arrangements of elements shown in FIG. 3B.

As shown in FIG. 3B, the headset registry server 350 includes a hardware processor 362 operably coupled to a memory 366, and a network interface 364. In one or more embodiments, the hardware processor 362, the memory 366, and the network interface 364 may remain in communication over one or more communication busses.

The network interface 364 allows for communication, using digital and/or analog signals, with one or more call endpoints 305 over a network. The network may include the network 210, described above in reference to FIG. 2. Via the network interface 364, the headset registry server 350 may receive an endpoint identifier (e.g., the endpoint identifier 315, etc.) from a call endpoint. Also, via the network interface 364, the headset registry server 350 may receive a headset identifier of a wireless headset from a call endpoint. Additionally, via the network interface 364, the headset registry server 350 may transmit a response to a call endpoint. The response may indicate whether a pairing between the call endpoint and the wireless headset is approved or unapproved.

The memory 366 includes any storage device capable of storing information temporarily or permanently. The memory 366 may include volatile and/or non-volatile memory, and may include more than one type of memory. For example, the memory 366 may include one or more of SDRAM, ROM, and flash memory. As depicted in FIG. 3B, the memory 366 includes a headset registry 370.

As described herein, the headset registry 370 is referenced by the headset registry server 350 to determine whether the pairing between a call endpoint and a wireless headset is approved or unapproved. To this end, the headset registry 370 includes a listing of approved headset associations 368. The listing of approved headset associations 368 includes, for a given call endpoint identifier, the unique identifiers of one or more wireless headsets that are approved to pair with the call endpoint having the call endpoint identifier. Accordingly, in one or more embodiments, the listing of approved headset associations 368 may include numerous call endpoint identifiers (e.g., MAC addresses, phone numbers, extensions, BD_ADDR values, etc.), each of which is associated with one or more wireless headset identifiers (e.g., BD_ADDR values, serial numbers, IPUIs, etc.). The headset registry 370 may be stored in any suitable structure. For example, the contents of the headset registry 370 may include an array, a linear list, a non-linear list, and/or a database.

In one or more embodiments, the listing of approved headset associations 368 may, for a given call endpoint, differentiate between wireless headsets approved for use as a primary call device and for use a conference device. As used herein, a primary call device includes a wireless headset that may be used to answer an incoming call to the call endpoint with which it is paired. On the other hand, a conference device is unable to answer an incoming call to the call endpoint with which it is paired, but may join an active call at the call endpoint when a primary call device is already actively participating (i.e., transmitting and/or receiving call audio, etc.) in the call. The listing of approved headset associations 368 may be managed by an administrator, and/or automatically updated during an asset provisioning process (i.e., when a new headset is ordered for a user). In one or more embodiments, the listing of approved headset associations 368 may be user configurable.

In one or more embodiments, some portion of the headset registry 370 may be reset on a periodic basis. For example, if the headset registry 370 includes a listing of approved headset associations 368 for a call endpoint that is configured for hoteling, the listing of approved headset associations 368 for the call endpoint may be regularly reset. The listing of approved headset associations for the call endpoint may be reset daily, weekly, etc.

Figure 4A:
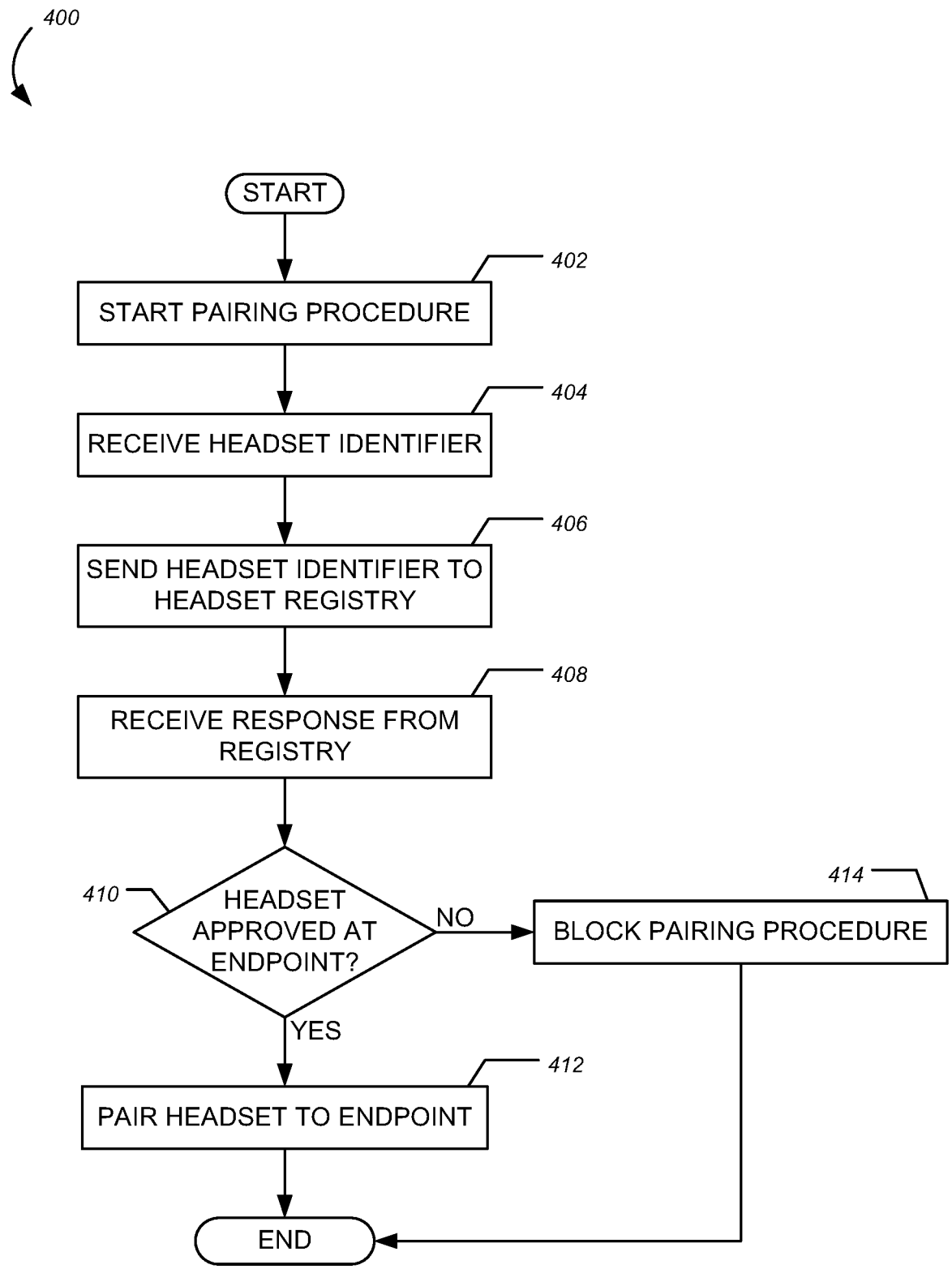
FIGS. 4A and 4B are flow diagrams showing methods for secure call endpoint pairing, in accordance with one or more embodiments.

FIG. 4A shows a flowchart of a method 400 for secure call endpoint pairing, in accordance with one or more embodiments of the invention. While the steps of the method 400 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 400 may be carried out by a call endpoint, such as the call endpoint 305, described above in reference to FIG. 3A.

At step 402, a pairing procedure is started. The pairing procedure is between the call endpoint performing the method 400 and a wireless headset. In one or more embodiments, the pairing procedure may be started in response to user operation of a user-operable control at the call endpoint. For example, a user may push a button or slide a switch on the call endpoint. In one or more embodiments, the pairing procedure may be started in response to a physical coupling of the call endpoint and the wireless headset. For example, the wireless headset may be docked or plugged into the call endpoint.

The pairing procedure includes any process intended to result in the generation of a security key based on the interaction of the call endpoint and the wireless headset. Thus, starting the pairing procedure includes any interaction between the call endpoint and the wireless headset that must occur prior to the security key being generated or prior to the security key being used to authenticate the devices. For example, starting the pairing procedure may include one or more of a device discovery step, an inquiry step, an initial connection step, a public key exchange step, and a capability exchange step. In other words, starting the pairing procedure may include one or more steps performed by the wireless headset and call endpoint executed for the purpose of establishing a shared key for subsequent use by the two devices. Any information exchanged during the start of the pairing procedure may be communicated wirelessly or over a physical connection.

For example, the pairing procedure may be started when a wireless headset is first dropped into or docked with a call endpoint, and performance of the method 400 may allow the call endpoint to determine whether the headset belongs to a user associated with the call endpoint, or instead another user. The start of the pairing procedure at step 402 may indicate an intent by a user, such as an intermeddler, to pair his or her wireless headset with the call endpoint executing the method 400 in order to send and receive call audio through the call endpoint.

Further, at step 404, a headset identifier is received from a wireless headset. The headset identifier may be received over the air or over a physical connection. The headset identifier includes any suitable unique identifier of the wireless headset. For example, the headset identifier may include a Bluetooth device address (i.e., BD_ADDR) of the wireless headset. As another example, if the wireless headset is a DECT device, the unique identifier of the wireless headset may include any suitable portable part identity (e.g., International Portable Part Equipment Identity (IPEI), Portable equipment Serial Number (PSN), International Portable User Identity (IPUI), etc.). The headset identifier may be received from the wireless headset prior to starting the pairing procedure, or during the pairing procedure.

The headset identifier received at step 404 is then sent, at step 406, to a headset registry server. The headset identifier may be sent to the headset registry server in a message sent over a network. The call endpoint may send to the headset registry server together with the headset identifier or separately, an endpoint identifier unique to the call endpoint. In one or more embodiments, the call endpoint may send additional information to the headset registry server. For example, the call endpoint may include an active call status indicator, which indicates whether or not there is an active call at the call endpoint. As another example, the call endpoint may include a pairing mode indicator, which indicates whether the headset identifier was provided to the call endpoint from the headset over the air or over a physical link.

At step 408, a response is received from the headset registry server. As described below, the headset registry server uses the headset identifier to determine whether or not pairing between the call endpoint and the wireless headset is approved. In particular, the headset registry server compares the headset identifier to a listing of approved headset associations, stored in a headset registry, to determine whether the pairing is approved. If the headset registry allows pairing between the call endpoint and the wireless headset, the response will indicate that the pairing is approved. If the headset registry does not allow pairing between the call endpoint and the wireless headset, the response will indicate that the pairing is not approved.

Accordingly, at step 410, the call endpoint performing the method 400 determines, based on the response from the headset registry server, whether the headset is approved at the call endpoint, and the pairing procedure is terminated based on the determination. In particular, if the response from the headset registry server indicates that the pairing is approved, the headset is allowed to pair with the call endpoint, and the pairing procedure is completed at step 412. Thus, with the performance of the step 412, a key may be generated by the wireless headset and call endpoint. However, if the response from the headset registry server indicates that the pairing is not approved, the headset is not allowed to pair with the call endpoint, and the pairing procedure is blocked at step 414.

Figure 4B:
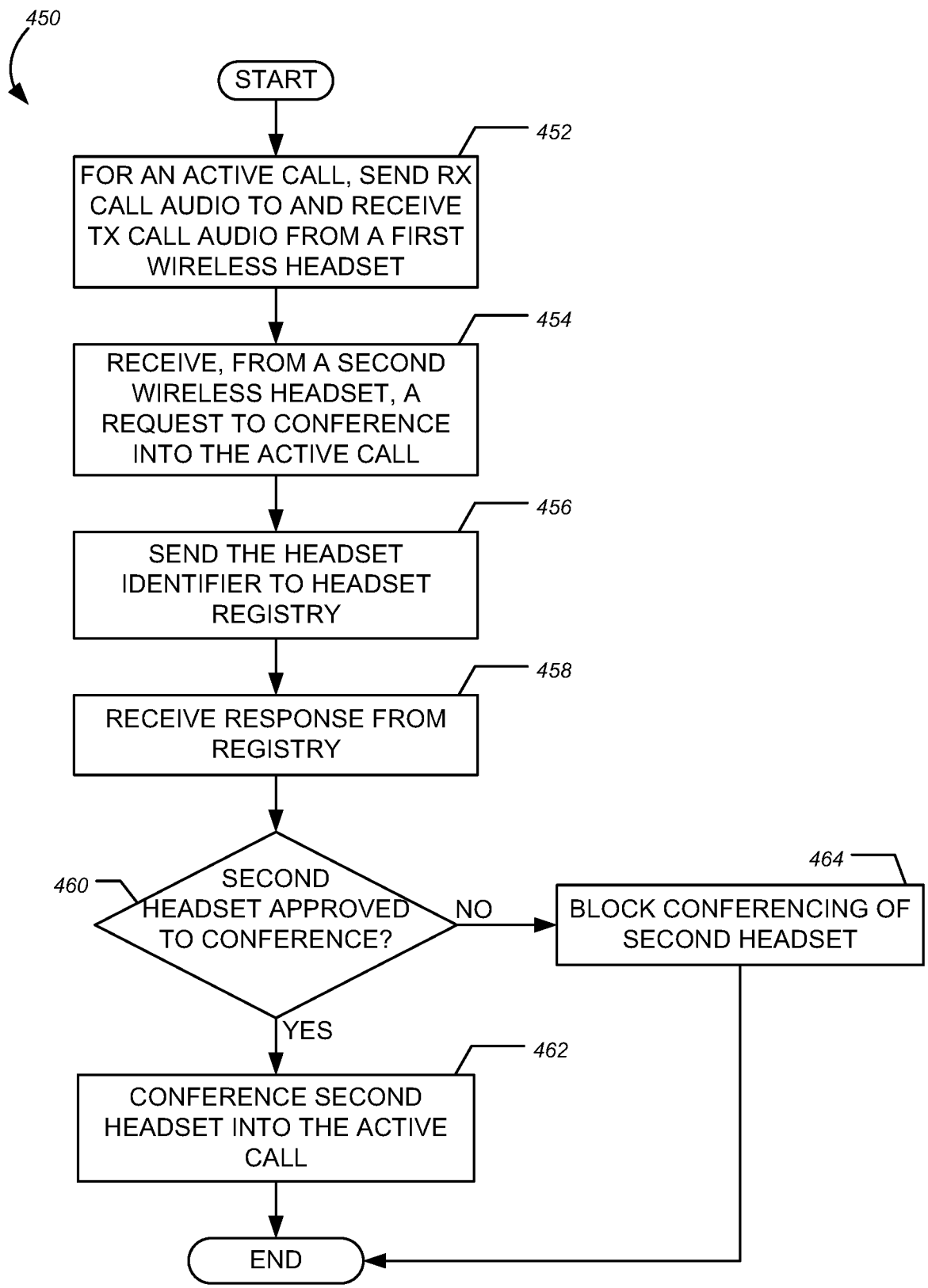

FIG. 4B shows a flowchart of a method 450 for secure call endpoint pairing, in accordance with one or more embodiments of the invention. While the steps of the method 450 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 450 may be carried out by a call endpoint, such as the call endpoint 305, described above in reference to FIG. 3A.

At step 452, an active call proceeds via the call endpoint performing the method 450. In particular, received call audio originating from a far end caller is being transmitted from the call endpoint to a first wireless headset. Also, transmit call audio is being received at the call endpoint from the first wireless headset for forwarding to the far end caller.

At step 454, a request to conference into the active call is received from a second wireless headset. The request from the second wireless headset includes a headset identifier of the second wireless headset. The headset identifier may be received over the air or over a physical connection. The headset identifier includes any suitable unique identifier of the wireless headset. In one or more embodiments, the request to conference into the active call may be signaled by a user operation of a user-operable control at the call endpoint and/or on the second wireless headset. In one or more embodiments, the request to conference into the active call may be signaled by a physical coupling of the call endpoint and the second wireless headset. For example, the second wireless headset may be docked or plugged into the call endpoint.

As described herein, a request to conference a wireless headset includes any request which, if accepted by the call endpoint, enables the wireless headset to receive a copy of the call audio in the channels sent to and received from the first wireless headset. A conferenced headset is only able to exchange call audio over a wireless link with a call endpoint when the call endpoint is already exchanging the call audio with another wireless headset. In other words, a conferenced headset is a wireless headset that has been paired with a call endpoint in a limited manner such that the conferenced wireless headset is unable to initiate outgoing calls or answer incoming calls. In one or more embodiments, conferencing in a wireless headset may include pairing with the wireless headset, authenticating the wireless headset, and then immediately opening a wireless link for exchanging call audio, where a key generated during the pairing procedure is deleted by the wireless headset and/or the call endpoint upon termination of the call and/or the wireless link. In one or more embodiments, conferencing in a wireless headset may include pairing with the wireless headset, but only accepting a request to open a wireless link from the headset when a call is currently active.

The headset identifier of the second wireless headset is sent, at step 456, to a headset registry server. The headset identifier may be sent to the headset registry server in a message sent over a network. The call endpoint may send to the headset registry server together with the headset identifier of the second wireless headset or separately, an endpoint identifier unique to the call endpoint. In one or more embodiments, the call endpoint may send additional information to the headset registry server. For example, the call endpoint may send to the headset registry server a request type indicator, which indicates that the second wireless headset has requested to conference into an active call. To this end, the call endpoint may include an active call status indicator, which indicates whether or not there is an active call at the call endpoint. As another example, the call endpoint may send to the headset registry server a pairing mode indicator, which indicates whether the headset identifier was provided to the call endpoint from the headset over the air or over a physical link.

At step 458, a response is received from the headset registry server. As described below, the headset registry server uses the headset identifier to determine whether or not the second wireless headset is approved to conference into calls at the call endpoint. In particular, the headset registry server compares the headset identifier of the second wireless headset to a listing of approved headset associations, stored in a headset registry, to determine whether to approve conferencing the second wireless headset. If the contents of the headset registry allow the second wireless headset to conference into the active call, the response will indicate that conferencing of the second wireless headset is approved. If the contents of the headset registry do not allow the second wireless headset to conference into the active call, the response will indicate that the conferencing of the second wireless headset is not approved.

At step 460, the call endpoint performing the method 450 determines whether the second wireless headset is approved to conference into the active call, and the request to conference in the second wireless headset is managed accordingly. If the response from the headset registry server indicates that conferencing of the second wireless headset is approved, the second wireless headset is conferenced into the active call at step 462. However, if the response from the headset registry server indicates that the conferencing request is not approved, the conferencing procedure is blocked at step 464.

Figure 5:
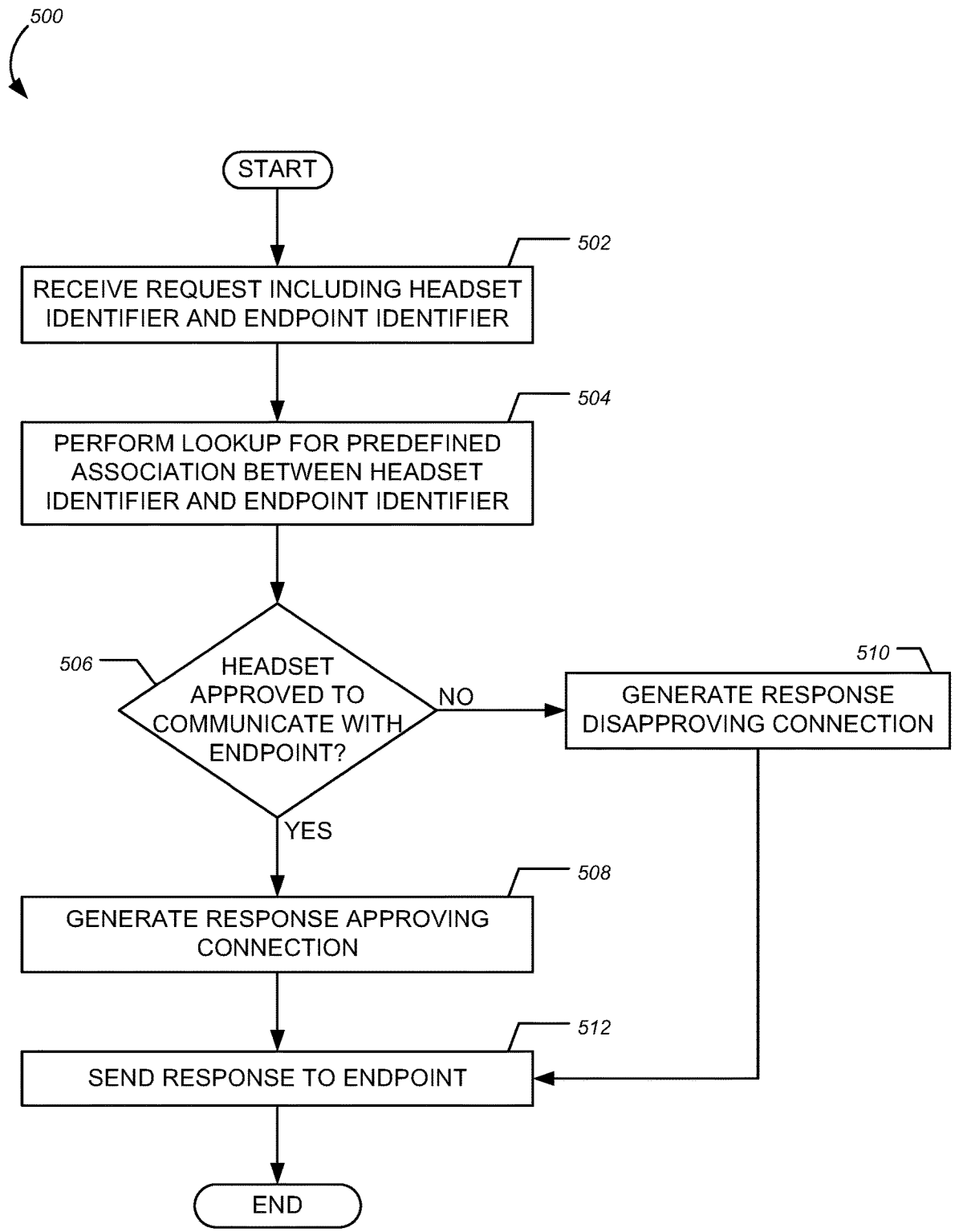
FIG. 5 is a flow diagram showing a method for secure call endpoint pairing, in accordance with one or more embodiments.

FIG. 5 shows a flowchart of a method 500 for secure call endpoint pairing, in accordance with one or more embodiments of the invention. While the steps of the method 500 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 500 may be carried out by a headset registry server, such as the headset registry server 350, described above in reference to FIG. 3B.

At step 502, a request is received from a call endpoint. The request includes a headset identifier and a call endpoint identifier. The call endpoint identifier may include the unique identifier of the call endpoint from which the request is received. The headset identifier may include a unique identifier of a wireless headset that has attempted to pair with the call endpoint or conference into an active call at the call endpoint. The headset identifier and the call endpoint identifier may be received over a network from the call endpoint. In one or more embodiments, the headset registry server may receive additional information in the request from the call endpoint. For example, the request may include a request type indicator, which indicates whether the wireless headset has requested to pair as a primary device or instead has requested to conference into an active call. In one or more embodiments, the headset registry server may receive in the request an active call status indicator, which indicates whether or not there is an active call at the call endpoint. In one or more embodiments, the headset registry server may receive in the request a pairing mode indicator, where the pairing mode indicator indicates whether the headset identifier was provided to the call endpoint from the headset over the air or over a physical link.

At step 504, a lookup is performed in a headset registry for a previously defined association between the headset identifier and the endpoint identifier received at step 502. Performing the lookup may include searching or querying the headset registry for the predefined association between the headset identifier and the call endpoint identifier. In particular, the headset registry server may reference the headset registry to determine whether the headset identifier is included in a predetermined list of devices approved to pair with and/or conference into calls at the call endpoint. For example, if the headset registry server receives one or more messages indicating a request to pair, as a primary device, the headset having the headset identifier with the call endpoint having the call endpoint identifier, the headset registry server may query the headset registry to determine whether such an association has been previously approved. The predefined association between the headset identifier and the call endpoint identifier includes any permission or relationship previously created in the headset registry that indicates the wireless headset having the headset identifier and the call endpoint having the call endpoint identifier are approved to authenticate with each other for the purpose of exchanging call audio.

In one or more embodiments, the lookup may include searching or querying the headset registry for the headset identifier in association with one or more other call endpoints. For example, the lookup may include searching the headset registry to determine if the headset identifier is from a wireless headset that is already associated with or paired with a call endpoint other than the call endpoint from which the request is received.

In one or more embodiments, the lookup may include additional information received in the request from the call endpoint. For example, the lookup may include a query for a permission to pair the call endpoint and wireless headset if the request includes an indicator that the headset has requested to pair as a primary device and/or an indicator that there is not an active call at the call endpoint. As another example, the lookup may include a query for a permission to conference the wireless headset at the call endpoint if the request includes an indicator that the headset has requested to conference into an active call and/or an indicator that there is currently an active call at the call endpoint. In one or more embodiments, the structure and/or method of the lookup may depend on whether the headset indicator was received at the call endpoint over the air or over a physical link.

Accordingly, at step 506, the headset registry server determines, based on the result of the lookup performed at step 504, whether the wireless headset having the headset identifier is approved to communicate with the endpoint having the endpoint identifier. For example, if the request received at step 502 is a request to pair the wireless headset with the call endpoint, then at step 506 it is determined whether such a pairing is approved based on a result of the lookup at step 504. As another example, if the request received at step 502 is a request to conference the wireless headset into an active call at the call endpoint, then at step 506 it is determined whether the wireless headset is approved to conference into the active call based on a result of the lookup at step 504. In other words, it is determined whether the headset registry includes a previously configured conference association between the call endpoint identifier and the headset identifier.

If the result of the lookup performed at step 504 indicates that the request received at step 502 is approved, then a response is generated, at step 508, approving the requested connection for the wireless headset and call endpoint. However, if the result of the lookup performed at step 504 indicates that the request received at step 502 is not approved, then a response is generated, at step 510, disapproving the requested connection for the wireless headset and call endpoint.

In one or more embodiments, the determination at step 506 may depend on whether the result of the lookup indicates that the headset having the headset identifier is already associated with another call endpoint. For example, if the wireless headset attempting to pair with the call endpoint is, according to the contents of the headset registry, already paired with a call endpoint associated with another user (e.g., another user in the same enterprise, etc.), then a response disapproving the connection may be generated at step 510.

The response generated at step 508 or 510 may include any message formatted in a manner suitable for transmission over a network to the call endpoint. Further, at step 512 the message is sent to the call endpoint. Upon receiving the response sent by the headset registry server at step 512, the call endpoint may pair with the wireless headset or block the pairing procedure, as described in the context of FIG. 4A, above; or the call endpoint may determine whether to conference in the wireless headset or block the conferencing of the wireless headset, as described in the context of FIG. 4B, above.

Figure 6A:
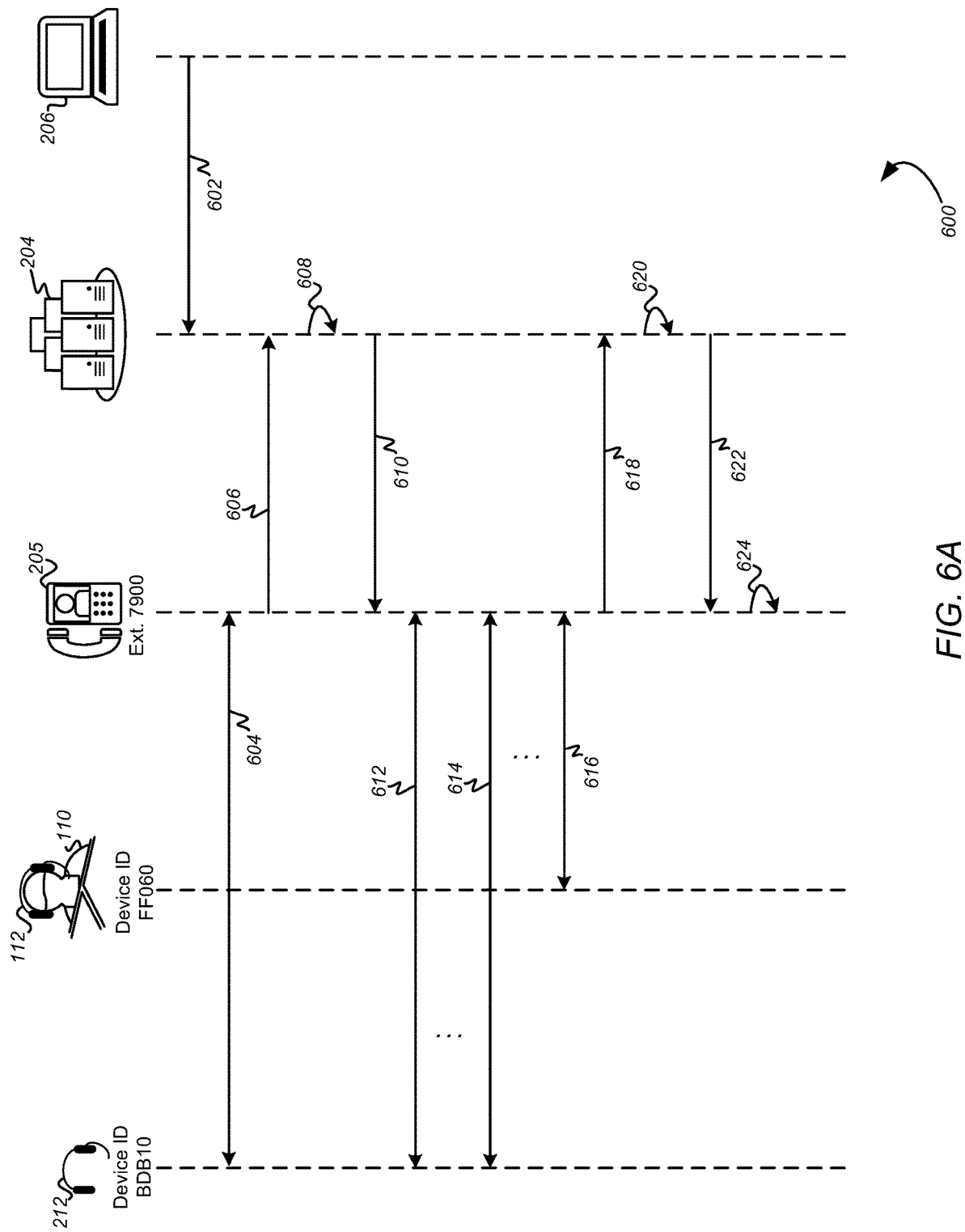

Referring to FIG. 6A, an example communication flow 600 for secure call endpoint pairing is shown in accordance with one or more embodiments of the invention. As depicted in FIG. 6A, the communication flow 600 proceeds between wireless headsets 212 and 112, a desk phone 205, a headset registry server 204, and a computer 206, each of which have been described above in the context of FIGS. 1 and 2.

At operation 602, a user (Joe Johnson) uses his computer 206 to configure approved headset associations for his desk phone 205. In particular, using a web-based graphical user interface 680, depicted in FIG. 6B, Joe can view and modify a listing of approved headset associations for a call endpoint—his desk phone 205 (i.e., Plantronics Deskphone 300) at extension 7900.

In one or more embodiments, the graphical user interface 680 of FIG. 6B may be generated by an application executing locally on Joe's computer 206 or by an application executing remotely (e.g., a web application, etc.). In any case, the graphical user interface 680 presents the user (i.e., Joe) with a clear indication of which wireless headsets are approved for pairing with his desk phone 205 connected at extension 7900. As shown in the user interface 680 of FIG. 6B, a first group of devices are configured as primary devices, and a second group of devices are configured as conference-only devices, which are allowed to connect with the call endpoint only when conferencing into a call already in progress.

In particular, Joe or an administrator has configured the headset registry at the headset registry server 204 to approve requests to pair the desk phone 205 at ext. 7900 with his Voyager 5200 headset (i.e., headset identifier ABC23) and Voyager 8200 UC headset (i.e., headset identifier BDB10). Thus, once paired, Joe's Voyager 5200 headset with headset identifier ABC23 and Joe's Voyager 8200 UC headset with headset identifier BDB10 may be used to initiate and answer incoming calls to the call endpoint. Also, Joe or administrator has configured the headset registry at the headset registry server 204 to approve requests from the desk phone 205 to conference in a Voyager Focus headset (i.e., headset identifier DB853) belonging to Sally Smith, a co-worker of Joe's. Accordingly, any request to Joe's Plantronics Deskphone 300 to pair a wireless headset not listed as an approved primary device will not be approved by the headset registry server 204. Also, any request to Joe's Plantronics Deskphone 300 to conference in a headset not listed as an approved conference device will not be approved by the headset registry server 204. Further, as shown in FIG. 6B, the graphical user interface 680 enables Joe to add or remove devices to or from either of the device groups. Any updates made by a user at the graphical user interface 680 may be pushed to the headset registry server 204 for appropriate update thereof. For example, updates at the graphical user interface 680 may result in Application Program Interface (API) calls to a service on the headset registry server 204 that maintains the headset registry.

Returning to FIG. 6A, at operation 604 a pairing procedure is initiated between the wireless headset 212 and the desk phone 205. Prior to or during the pairing procedure, the wireless headset 212 shares its headset identifier (i.e., BDB10) with the desk phone 205. The pairing procedure is unable to complete without approval from the headset registry server 204. Accordingly, at operation 606, the desk phone 205 sends to the headset registry server 204 the headset identifier received from the wireless headset 212. At operation 608, the headset registry server 204 performs a lookup in its headset registry to determine whether the pairing operation between the wireless headset 212 and the desk phone 205 is approved. In particular, at operation 608, the headset registry server 204 references a predefined list of approved headset associations for the desk phone 205 to determine that there is a previously defined primary device association between the identifier of the wireless headset 212 and an identifier of the desk phone 205. Accordingly, the headset registry server 204 generates a response approving the pairing of the wireless headset 212 and the desk phone 205, and, at operation 610, sends the response to the desk phone 205. Upon receiving the response from the headset registry server 204, and at operation 612, the desk phone 205 completes the pairing procedure with the wireless headset 212, generating a shared key for authenticating the wireless headset 212 during subsequent interactions. Thus, at operation 614, the wireless headset 212 and the desk phone 205 may automatically form a wireless link when within range of each other, thereby allowing Joe to use the wireless headset 212 to answer incoming calls to the desk phone 205. Also, the wireless link formed at operation 614 may allow Joe to use the wireless headset 212 to initiate outgoing calls from the desk phone 205.

Sometime later, while Joe is away from his workstation, an intermeddler 110 approaches Joe's workstation with a second wireless headset 112 in his or her hand. The intermeddler 110 may be aware of a call Joe is expecting later in the day, and intend to intercept it, or the intermeddler 110 may know that Joe is currently on a call at the desk phone 205, but has stepped into a nearby room for conversational privacy. In any case, the intermeddler 110 drops the headset 112 into a dock on the desk phone 205, which kicks off a pairing procedure, at operation 616, between the second wireless headset 112 and the desk phone 205. Prior to or during the pairing procedure, the second wireless headset 112 shares its headset identifier (i.e., FF060) with the desk phone 205. The pairing procedure is unable to complete without approval from the headset registry server 204. Accordingly, at operation 618, the desk phone 205 sends to the headset registry server 204 the headset identifier received from the second wireless headset 112. If there is an active call at the desk phone 205 at the time the second wireless headset 112 starts the pairing procedure, the desk phone 205 may send to the headset registry server 204 additional information indicating an active call at the desk phone 205 and/or that the request is to conference. If there is not an active call at the desk phone 205 at the time the second wireless headset 112 starts the pairing procedure, the desk phone 205 may send to the headset registry server 204 additional information indicating no active call at the desk phone 205 and/or that the request is to pair as a primary device.

Accordingly, at operation 620, the headset registry server 204 performs a lookup in its headset registry to determine whether the pairing operation between the second wireless headset 112 and the desk phone 205 is approved. For example, if the contents of the request from the desk phone 205 indicate a request to conference, then at operation 620 the headset registry server 204 references a predefined list of approved headset associations for the desk phone 205 to determine if there is a previously defined conference device association between the identifier of the second wireless headset 112 and an identifier of the desk phone 205. As another example, if the contents of the request from the desk phone 205 indicate a request to pair as a primary device, then at operation 620 the headset registry server 204 references a predefined list of approved headset associations for the desk phone 205 to determine if there is a previously defined primary device association between the identifier of the second wireless headset 112 and an identifier of the desk phone 205.

In either case, the headset identifier of the second wireless headset 112 of the intermeddler 110 has not been previously configured for use with the desk phone 205. Accordingly, the headset registry server 204 generates a response disapproving the pairing of the second wireless headset 112 and the desk phone 205, and, at operation 622, sends the response to the desk phone 205. Upon receiving the response from the headset registry server 204, the desk phone 205 fails to complete pairing with the wireless headset 112. In particular, at operation 624, the desk phone 205 terminates the pairing procedure without generating a shared key, thereby preventing the intermeddler 110 from answering calls on behalf of Joe, or from conferencing into Joe's calls.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:
1. A method for secure call endpoint pairing, comprising:
during an active call at a call endpoint, sending receive call audio to a first wireless headset and receiving transmit call audio from the first wireless headset;
during the active call, receiving, from a second wireless headset, a request to conference into the active call, wherein the request includes a headset identifier of the second wireless headset, the headset identifier uniquely identifying the second wireless headset from among a plurality of wireless headsets,
wherein the request to conference into the active call is received in response to an operation of a user-operable control of the call endpoint;
in response to receiving the request, and during the active call, sending, to a headset registry server, the headset identifier of the second wireless headset;
receiving a response from the headset registry server, the response depending on whether the second wireless headset is approved at the call endpoint, wherein whether the headset is approved is based on the headset identifier; and based on the response from the headset registry server, managing the request to conference into the active call from the second wireless headset.

2. The method of claim 1, wherein managing the request to conference into the active call includes conferencing the second wireless headset into the active call based on the response from the headset registry server.

3. The method of claim 1, wherein managing the request to conference into the active call includes blocking the second wireless headset from conferencing into the active call based on the response from the headset registry server.

4. The method of claim 1, wherein the headset identifier of the second wireless headset includes a Bluetooth device address of the second wireless headset.

5. The method of claim 1, wherein the headset identifier of the second wireless headset includes a portable part identity of the second wireless headset.

6. A method for secure call endpoint pairing, comprising:
receiving, by a headset registry server, from a call endpoint, and during an active call involving a first wireless headset at the call endpoint, a request from a second wireless headset to conference into the active call, wherein the request includes a headset identifier of the second wireless headset, the headset identifier uniquely identifying the second wireless headset from among a plurality of wireless headsets,
wherein the request to conference into the active call is received in response to an operation of a user-operable control of the call endpoint;
the request including a headset identifier of the second wireless headset and a call endpoint identifier of the call endpoint, wherein the headset identifier uniquely identifies the second wireless headset from among a plurality of wireless headsets;
in response to receiving the request, performing, by the headset registry server, a lookup for a previously defined association between the headset identifier and the call endpoint identifier;
based on a result of the lookup, determining, by the headset registry server, whether the second wireless headset is approved to conference into the active call;
generating, by the headset registry server, a response based on the determination; and
sending the response to the call endpoint.

7. The method of claim 6, wherein the request includes an indication that the wireless headset has requested to pair with the call endpoint as a primary device.

8. The method of claim 6, wherein the request includes an indication that the wireless headset has requested to conference into an active call at the call endpoint.

9. The method of claim 6, wherein performing the lookup includes querying a headset registry containing a predetermined list of devices approved to pair with and conference into active calls at the call endpoint.

* * * * *